(12) United States Patent
Childs et al.

(10) Patent No.: US 7,054,516 B2
(45) Date of Patent: May 30, 2006

(54) INTEGRATED OPTICAL DEVICE

(76) Inventors: Russell Childs, 52 East Craigs Rigg, Edinburgh (GB) EH128JA; Mark Volanthen, 19/13 Sinclair Place, Edinburgh (GB) EH106JL; Johannes Bos, Schurinksdwarsweg 20, NL-7523 AV Enschede (NL); Daniel Ortega Gonzalez, 4 Rosslyn Terrace, Glasgow (GB) G129NB; Graeme Gordon, 8 Harbor Place, Dalgety Bay, Fife (GB) KY119GD; Antoine Pujol, 1 Randolph Lane, Edinburgh (GB) EH37TD ( * ) Notice: Subject to any disclaimer, the term of this patent is extended or adjusted under 35 U.S.C. 154(b) by 0 days.

(21) Appl. No.: 10/734,110

(22) Filed: Dec. 15, 2003

(65) Prior Publication Data

US 2004/0170368 A1 Sep. 2, 2004

Related U.S. Application Data

(63) Continuation of application No. 10/344,347, filed as application No. PCT/GB01/03622 on Aug. 13, 2001, now abandoned.

(30) Foreign Application Priority Data

Aug. 11, 2000 (GB) ................... 0019883.8

(51) Int. Cl.
*G02B 6/12* (2006.01)
*H01L 21/00* (2006.01)

(52) U.S. Cl. .......................... 385/14; 385/11; 385/130; 385/131; 385/132; 438/24; 438/29; 438/31

(58) Field of Classification Search ................... 385/37, 385/129, 130, 131, 132, 1, 2, 3, 14, 11, 24; 257/347; 438/24, 29, 31
See application file for complete search history.

(56) References Cited

U.S. PATENT DOCUMENTS 4,781,424 A * 11/1988 Kawachi et al. ............ 385/132

(Continued)

FOREIGN PATENT DOCUMENTS

EP 0431527 A2 6/1991

(Continued)

OTHER PUBLICATIONS

A. Kilian et al, "Birefringence Free Planar Optical Waveguide Made by Flame Hydrolysis Deposition (FHD) Through Tailoring of the Overcladding", Journal of Lightwave Technology, IEEE, NY, US, vol. 18, No. 2 Feb. 1, 2000, pp. 193-198, XP001001814.

(Continued)

*Primary Examiner*—Brian M. Healy

(57) ABSTRACT

An integrated optical device includes a substrate, at least a face of the substrate providing a first cladding layer, the first cladding layer including a mesa formation; a waveguide core formed on the first cladding layer so that the waveguide core substantially covers the mesa formation; and a second cladding layer formed over the waveguide core and the first cladding layer.

20 Claims, 14 Drawing Sheets

U.S. PATENT DOCUMENTS

| | | | |
|---|---|---|---|
| 4,904,037 A * | 2/1990 | Imoto et al. | 385/14 |
| 5,838,870 A * | 11/1998 | Soref | 385/131 |
| 6,282,332 B1 * | 8/2001 | Bosso et al. | 385/7 |
| 6,453,086 B1 * | 9/2002 | Tarazona | 385/20 |
| 6,519,027 B1 * | 2/2003 | Gordon et al. | 356/73.1 |

FOREIGN PATENT DOCUMENTS

| | | | |
|---|---|---|---|
| EP | 0532229 A1 | 3/1993 | |
| EP | 0545820 A1 | 6/1993 | |
| EP | 0729042 A1 | 8/1996 | |
| EP | 0907090 A2 | 4/1999 | |
| JP | 070074396 A | 3/1995 | |
| JP | 3251211 B2 | 3/1999 | 385/14 X |
| WO | WO 0022465 | 4/2000 | |

OTHER PUBLICATIONS

Patent Abstracts of Japan, vol. 1999, No. 8, Jun. 30, 1999 corresponding to JP 11 064655 (A) NEC Corp). dated Mar. 5, 1999.

E. Wildermuth et al, "Penalty-free polarisation compensation of Si02/Si arrayed waveguide grating wavelength multiplexers using stress release grooves" Electronics Letters, IEE Stevenage, GB, vol. 34, No. 17, Aug. 20, 1998, pp. 1661-1663, XP006010219.

* cited by examiner

INTEGRATED OPTICAL DEVICE

This is a continuation of U.S. application Ser. No. 10/344,347, now abandoned which is a national stage entry under 371 of PCT/GB01/03622 filed Aug. 13, 2001, which is based on Great Britain Patent Application No. 0019883.8 filed Aug. 11, 2000, the benefit of which is claimed under 35 U.S.C. 119.

BACKGROUND OF THE INVENTION

This invention relates to integrated optical devices and their method of fabrication.

In the development of optical networks, so-called integrated optical components using waveguides established on a planar substrate are being extensively investigated.

In integrated optical devices, waveguide "cores" are deposited onto a substrate (or more generally onto an undercladding formed on the substrate) and are then covered by an overcladding layer. The refractive indices and other optical properties of the core and cladding materials are set to provide an appropriate waveguiding function. The skilled man will appreciate that terms such as "undercladding", "overcladding", "beneath" and the like are used merely for convenience of the description and do not imply any particular orientation of the device during fabrication or use.

A problem which can arise in integrated devices of this nature is that of birefringence. Although the mechanism by which the birefringence arises has not been proven, it is thought to result from differences in thermal expansion properties between layers in the device structures, which cause stresses to build up when the device is cooled after sintering or annealing.

Various possible solutions to this problem are summarised, with references, in the paper "Birefringence free planar optical waveguide made by flame hydrolysis deposition (FHD) through tailoring of the overcladding", Kilian et al, Journal of Lightwave Technology Vol. 18, No 2, February 2000. Mostly the previously proposed solutions involve altering the thermal properties of the overcladding, generally to try to match the thermal coefficient of expansion of the overcladding to that of the core, undercladding or substrate. A specific example of this technique is disclosed in U.S. Pat. No. 5,930,439. While this aim can be achieved by careful choice of dopants, it has been found that the overcladding glass has to be so dopant-rich that it becomes very sensitive to moisture, leading to device unreliability.

An alternative approach is described in the paper "Penalty-free polarisation compensation of $SiO_2$/Si arrayed waveguide grating wavelength multiplexers using stress release grooves", Wildermuth et al, Electronics Letters Vol. 34, No 17, August 1998. Here, a stress-relieving groove is etched along either side of the waveguide cores. In the context of an arrayed waveguide grating (AWG) device having a large number of substantially parallel waveguide cores, this means interspersing those cores with deep grooves. This process is considered to be unattractive because of the need for a significant extra process step to etch the grooves, the difficulty of aligning the groove etching with the waveguide cores, and the extra substrate area taken up by the grooves.

SUMMARY OF THE INVENTION

This invention provides a method of fabricating an integrated optical device on a substrate, at least a face of the substrate providing a first cladding layer, the method comprising the steps of:

(i) forming a core material layer on the first cladding layer;

(ii) etching the device in regions forming the complement of a desired waveguide core, the etching step removing material from the core material layer and at least some material from the first cladding layer so that the first cladding layer forms a mesa formation substantially covered by the waveguide core; and (iii) forming a second cladding layer over the first cladding layer and waveguide core.

The invention provides a new method of fabrication and device structure which can lead to a reduced or substantially zero birefringence without the need for heavy doping of the cladding or a separate etching step.

As part of the core etching process, during which excess material of a core material layer is removed by etching (having applied masks so as to leave the core paths unetched), the etching is continued into the undercladding layer. This "over-etching" technique leaves a mesa formation beneath the core. When the overcladding is applied, it extends around the core (as before) but also to a small extent beneath the level of the core.

This arrangement has been found to affect the core birefringence. By selection of an appropriate over-etch depth (mesa height) a reduced or substantially zero core birefringence can be obtained.

The invention is applicable to substrates such as silicon or germanium, on which an undercladding layer is generally grown or deposited. Here, it is considered that the substrate with the undercladding layer already grown or deposited on it provides a substrate whereby "at least a face of the substrate provides a first cladding layer". However, it is not always necessary to grow or deposit an undercladding layer. An example here is a quartz substrate where the optical properties of the substrates itself are such that the core can be deposited directly on to the substrate. Again, because an upper layer of the substrate itself acts as the undercladding for light-guiding purposes, it is considered that such a substrate also provides a substrate whereby at least a face of the substrate provides a first cladding layer.

Preferably the mesa formation has a height such that substantially zero core birefringence is obtained. For example, it is preferred that the mesa formation has a height of at least 1 µm, and more preferably between about 2 µm and about 4 µm. It is appreciated that a smaller degree of over-etching may have occurred in the past, for example to ensure that the core material was fully etched away.

Although the invention is applicable to many types of device, it is preferred that the substrate is a silicon substrate and/or the first cladding layer is predominantly silicon dioxide.

In order to achieve a lower mesa height for a desired birefringence performance, it is preferred that the linear coefficient of expansion of the material of the second cladding layer is greater than that of the material of the core material layer.

This invention also provides an integrated optical device comprising:

a substrate, at least a face of the substrate providing a first cladding layer, the first cladding layer including a mesa formation;

a waveguide core formed on the first cladding layer so that the waveguide core substantially covers the mesa formation; and a second cladding layer formed over the waveguide core and the first cladding layer.

A further aspect of the invention provides an arrayed waveguide grating (AWG) comprising:

a substrate, at least a face of the substrate providing a first cladding layer, the first cladding layer including a mesa formation;

a plurality of array waveguides provided on the substrate, each array waveguide having a waveguide core formed on the first cladding layer so that the waveguide core substantially covers the mesa formation; a second cladding layer formed over the waveguide cores and the first cladding layer; and wherein the height of the mesa formation is in the range of about 2 to about 4 μm; the stress in the second cladding layer is in the range of −20 to +10 MPascals; and the width of the waveguide cores in a direction parallel to the plane of the substrate is in the range of 5.80 to 6.20 μm.

BRIEF DESCRIPTION OF THE DRAWINGS

Embodiments of the invention will now be described with reference to the accompanying drawings, throughout which like parts are referred to by like references, and in which.

DETAILED DESCRIPTION OF THE INVENTION

Figure 1A:
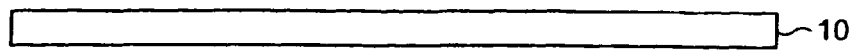
FIGS. 1a to 1f are schematic cross-sectional illustrations of process steps in the fabrication of part of an integrated optical device according to an embodiment of the invention.
Figure 1B:
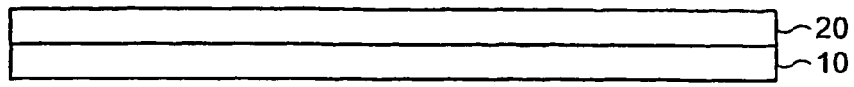

Referring now to the drawings, FIGS. 1a to 1f are schematic cross-sectional illustrations of process steps in the fabrication of part of an integrated optical device according to an embodiment of the invention. In prototype investigations, a 40 channel arrayed waveguide grating (AWG) having a 100 GHz channel spacing and 250 μm output waveguide pitch was fabricated, but in other embodiments of the invention many types of optical signal handling devices may be fabricated using this technique, such as variable optical attenuators, optical switches or routers and/or optical filters. The technique is generally applicable to any integrated optical component using a waveguide structure.

FIG. 1a schematically illustrates a silicon substrate 10 on which a 16 μm thick thermal oxide undercladding layer 20 is grown. (It is noted that FIGS. 1a to 1f are highly schematic and in any event not to scale).

Figure 1C:
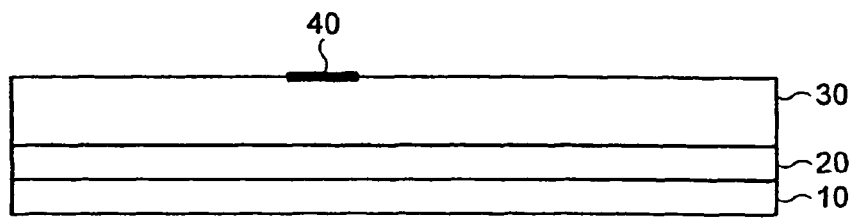

In FIG. 1c, a layer of waveguide core glass 30 is deposited, for example by flame hydrolysis deposition (FHD). In a preferred embodiment, the layer 30 is 6 μm thick after an annealing stage to consolidate the FHD-deposited material. A mask 40 is applied to mask the path of a desired waveguide core. The mask is preferably formed by photolithographically spinning and exposing a resist layer, followed by development and coating with a metal layer by evaporation. The resist and its cover of metal can be lifted off with acetone to leave the metal mask 40.

Figure 1D:
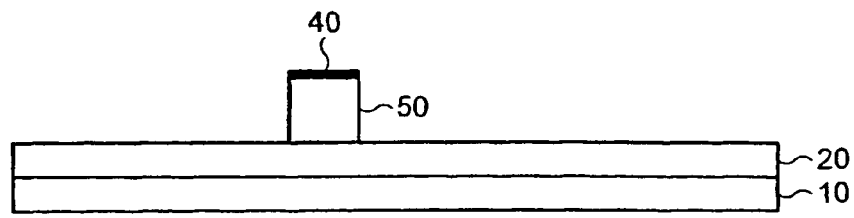

In FIG. 1d, an etching step is carried out using conventional wet or dry etching techniques.

The etching step etches away parts of the core material layer 30 not covered by the mask 40, that is to say, regions forming the complement of the desired waveguide path are removed from the core material layer 30. This leaves a substantially square section (6 μm×6 μm) core 50.

In a conventional fabrication process, the next step would be to remove the mask 40 and apply an overcladding layer to the structure of FIG. 1d. In embodiments of the present invention, however, the etching process is continued further, still using the mask 40 to define regions to be etched.

Figure 1E:
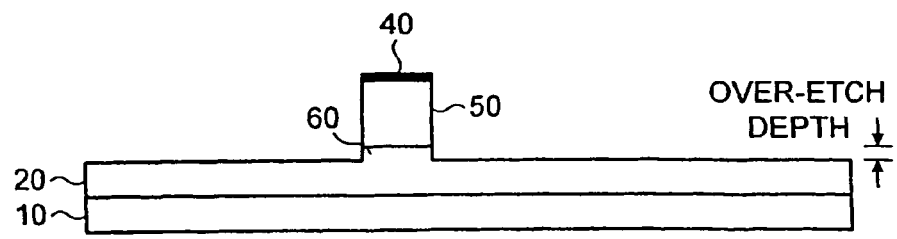

As shown in FIG. 1e, the etching process is carried on so that part of the undercladding layer 20 is etched away in regions not protected by the mask 40. This "over-etching" process leaves an undercladding layer 20 which is thinner across most of the device, but which forms a mesa formation 60 substantially covered by the core 50. The height of the mesa formation may also be equivalently referred to as an "over-etch depth" and may typically be in the range of 2 μm to 3 μm, but preferably in any event greater than 1 μm.

Figure 1F:
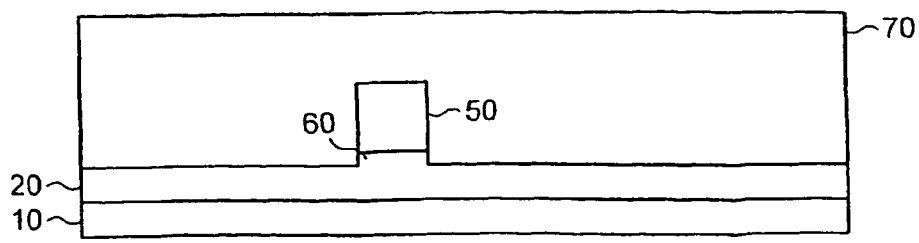

Finally, in FIG. 1f the mask 40 is removed by conventional techniques and the waveguide and undercladding are covered by an overcladding layer 70. In this prototype embodiment the overcladding layer 70 is 22 μm thick (at its thickest) and is a glass formed by FHD deposition using $SiCl_4$, $BCl_3$ and $POCl_3$. The overcladding composition is such that its refractive index is roughly matched to that of the silica undercladding, and its thermal expansion is slightly higher than that of the silicon substrate (as measured by warpage of coated wafers).

Figure 2:
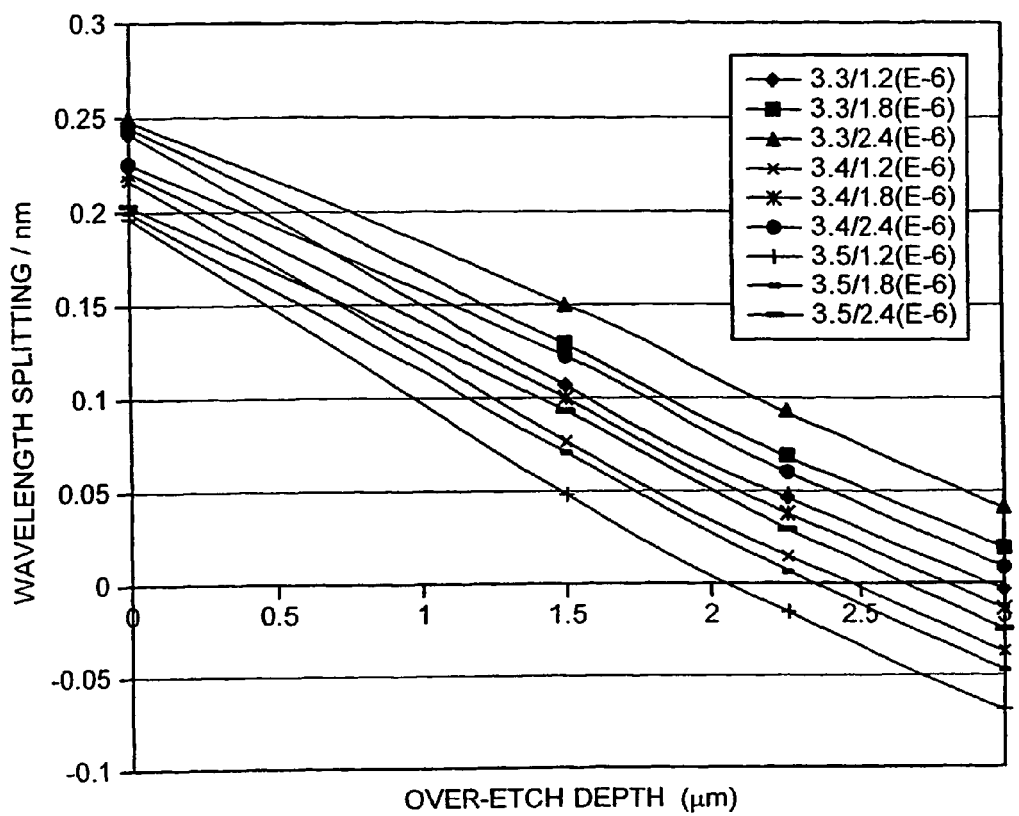
FIG. 2 is a graph of birefringence against over-etch depth as predicted by computer modelling for various material properties.

FIG. 2 is a graph of birefringence against over-etch depth as predicted by computer modelling for various material properties.

The effect that over-etching has on the birefringence of a single waveguide was simulated by Finite Element Modelling analysis to determine the stresses applied to the waveguide core. The ordinary and extraordinary refractive index changes were then calculated from the stresses. By means of perturbation calculations, the change in effective refractive index ($Neff_{TE}-Neff_{TM}$) was determined.

It was found that the effect of over-etching was influenced by the linear coefficient of expansion (lce) of the core and the cladding. So, in the computer modelling various combinations of lce values were used.

The following material parameters were used in the computer modelling. These are the values reported in the paper by Kilian et al referred to above.

| | Symbol | Si | SiO$_2$ under-cladding | Over-cladding | Core |
|---|---|---|---|---|---|
| Youngs' Modulus GPA) | E | 169 | 72.5 | 70 | 65 |
| Poisson ratio [-] | V | 0.064 | 0.17 | 0.2 | 0.2 |
| Linear coefficient of expansion [K$^{-1}$] | A | 3.6E-6 | 1.2E-6 | Varied (3.3–3.5) E-6 | Varied (1.2–2.4) E-6 |

The lce of the overcladding was varied among three possible values, namely:

$3.3 \times 10^{-6}$ $3.4 \times 10^{-6}$ $3.5 \times 10^{-6}$

Similarly, the lce for the core was modelled at three possible values, namely:

$1.2 \times 10^{-6}$ $1.8 \times 10^{-6}$ $2.4 \times 10^{-6}$ giving nine curves in all. The vertical axis has been calibrated to represent wavelength splitting between the two polarisations, as used in the empirical results of FIG. 3, so that a comparison can be made.

The results shown in FIG. 2 indicate that birefringence depends substantially linearly on the over-etch depth. The slope of the dependence depends on the lce values of the core and the overcladding. An ideal over-etch depth is considered to be one where the relevant curve crosses the zero-birefringence axis.

In the graph of FIG. 2, the legend indicates first the value of the overcladding lce ($\times 10^{-6}$) followed by the value of the core lce ($\times 10^{-6}$). It can be seen that a zero birefringence is obtained for an over-etch depth of about 2 μm upwards using the example parameters. The lowest over-etch depth giving a zero birefringence in this model is obtained for a combination of high lce for the cladding and low lce for the core. This model ignores any stress influence due to neighbouring waveguides and also does not consider the index contrast which may have an influence on the ideal over-etch depth.

Figure 3:
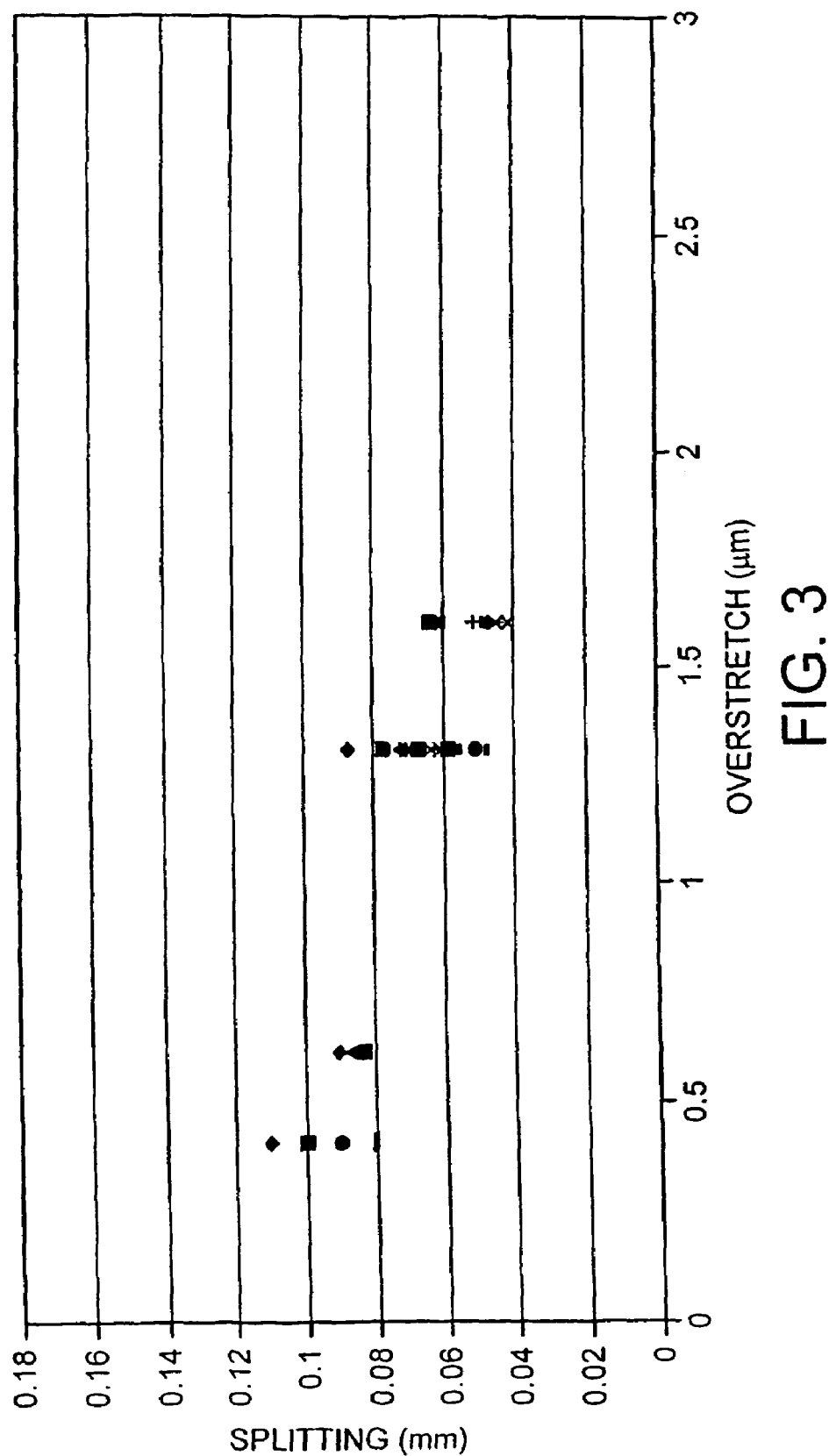
FIG. 3 is a graph of birefringence against over-etch depth as obtained by experiment.

In order to test the theoretical results, a series of prototype devices constructed as described above were tested. The core birefringence was detected by measuring the filter response or passband for two polarisation states, one parallel to the plane of the substrate and one perpendicular, and detecting the wavelength splitting (in nm) between the two. The results are shown in FIG. 3 which indicate the same generally linear dependence between birefringence and over-etch depth as that predicted by the FEM analysis, crossing the zero-birefringence axis at an over-etch depth of about 3 μm.

Figure 4:
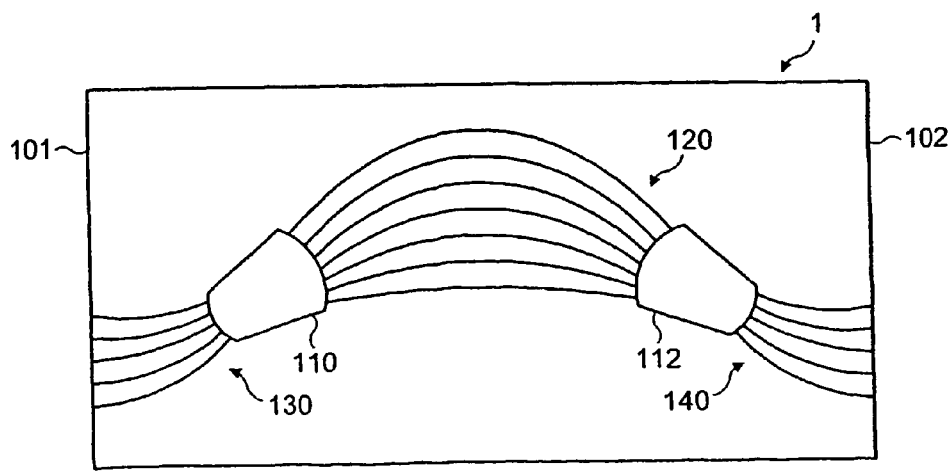
FIG. 4 schematically illustrates a typical arrayed waveguide grating (AWG)

Some further investigations have also been carried out to study the influence on the splitting in a 40 channel AWG of other parameters such as the width of the array waveguides in the AWG, the stress in the (over) cladding of the array waveguides, the stress in the core layer from which the array waveguide cores are formed, the refractive index of the core and of the cladding of the array waveguides, and the temperature of the AWG. AWGs are now well known in the art and so the skilled man will already have a full understanding of their structure and operation, for example as reviewed in "PHASAR-based WDM-Devices: Principles, Design and applications", by M. K. Smit, IEEE Journal of Selected Topics in Quantum Electronics Vol2. No2, June 1996. Splitting measurements were made on individual AWG dies, in-line measurements on wafers were made for other parameters, and corresponding simulations to model the effect of variations in these other parameters on the splitting were also carried out. The AWGs which were measured had glass waveguide cores and cladding formed by FHD deposition, using $SiCl_4$, $BCL_3$ and $GeCL_4$ for the cores, and $SiCL_4$, $BCl_3$ and $POCl_3$ for the cladding. For illustrative purposes a typical AWG is shown schematically in FIG. 4 and comprises a die 1 having formed thereon two slab waveguides 110,112 between which are coupled the plurality of array waveguides 120 (only some shown—typically there are about 400 to 600 of them). A plurality of input waveguides 130 are coupled between an input edge 101 of the die 1 (diced from a wafer containing several such die) and a first one 110 of the slab waveguides, and a plurality of output waveguides 140 are coupled between an output edge 102 of the die and the second one 112 of the slab waveguides. The AWG has a 100 GHz channel spacing. The spacing between the output waveguides at the output edge of the die is of the order of 100 μm, and the spacing of the input waveguides at the input edge is similar. Both the practical measurements and simulations have shown that both the waveguide width (in a direction parallel to the plane of the substrate), the stress in the (over) cladding and the stress in the core layer have a noticeable effect on the splitting, while the core refractive index and clad index have a relatively insignificant effect on the splitting. As part of these further studies further investigations were also carried out on the correlation between the amount of over-etch (i.e. the mesa height) in the array waveguides and the splitting. The results of all these investigations are presented together below.

The Simulations

For the simulations a stress model (STRESS SELENE software, marketed by Kymata Netherlands) and mode solvers were used to generate the splitting of channels 1 to 40 of a 40 channel AWG, for 8 different parameters: Core index, Clad index, Core height, Core width, Core stress, Clad stress (in the overcladding), over etch depth, and average separation between waveguides in the AWG array (hereinafter referred to as the "array pitch", h). This latter parameter is a design parameter which is set by the designer of the AWG.

Using a DOE (Design of Experiments) program named Matrex (Version 2.5), marketed by RSD Associates (Glasgow), a space was generated where the calculations were performed. Once all the simulations in the space were performed Matrex was used to generate a polynomial that interpolates the values of splitting in the space. We assumed that each parameter had equal probability of occurrence at any point in the working space. Using a Microsoft Excel macro we populated the space with as many points as the software could handle. Therefore for each parameter value we also have plotted points across the width of variation of all the other parameter in the working space.

The limits used in the simulation were as follows:

a=Core index
b=Clad index
c=Core Height (@m)

d=Core Width (μm)
e=Over etch (μm)
f=Magnitude of compressive core stress (Mpascals)
g=Clad stress (Mpascals)
h=Array pitch (μm)
a=1.4551
b=1.4451
c=6
d=5.98
e=3.05
f=70
g=−5.5
h=13.55
a_up=a+0.0001
b_up=b+0.0005
c_up=c+0.2
d_up=d+0.2
e_up=e+0.5
f_up=f+10
g_up=g+10
h_up=h+0
a_low=a−0.0001
b_low=b−0.0005
c_low=c−0.2
d_low=d−0.2
e_low=e−0.5
f_low=f−10
g_low=g−10
h_low=h−0

The Experimental Data

The experimental data was obtained from measurements made on individual AWG structures and/or test structures on wafers from several batches of wafers containing AWG structures, over-etch, stress and core width measurements being taken before the wafers were diced into individual AWG die, and splitting measurements being taken after dicing. Over-etch, stress and core width measurements were taken from about 4 to 5 AWGs on each wafer. Splitting measurements were taken from each AWG die obtained from every batch of wafers. The array pitch in each of the AWG devices was approximately 12 μm.

Splitting Values

From analysis of many different batches of wafers we have found that the wavelength splitting, defined as TM-TE, the difference in wavelength between the TM and TE polarization modes, can in fact be either positive or negative. Each batch of wafers typically consisted of about 12 to 30 wafers, and each wafer typically contains 6 AWG structures. We have found that the sign (+ve or −ve) of the slope of the (measured magnitude of) splitting as a function of AWG channel number, plotted for any one AWG, determines the sign (+ve or −ve) of the splitting in that AWG. For each batch of wafers, we tested at least one AWG die from each wafer (typically we tested a few AWGs from each wafer) and we plotted the value of the slope of the splitting as a function of AWG channel number (1 to 40) for each tested AWG, against the average splitting (magnitude) over channels 2 to 39 of that AWG. From this we found that in some batches all the wafers have a positive splitting slope, in some others all the wafers have a negative slope, and in some batches there is a mix of both positive and negative slopes. To obtain the experimental results presented below we used only those batches of wafers having purely positive or purely negative splitting slopes.

Correlation Between Over-etch and Splitting

Figure 5:
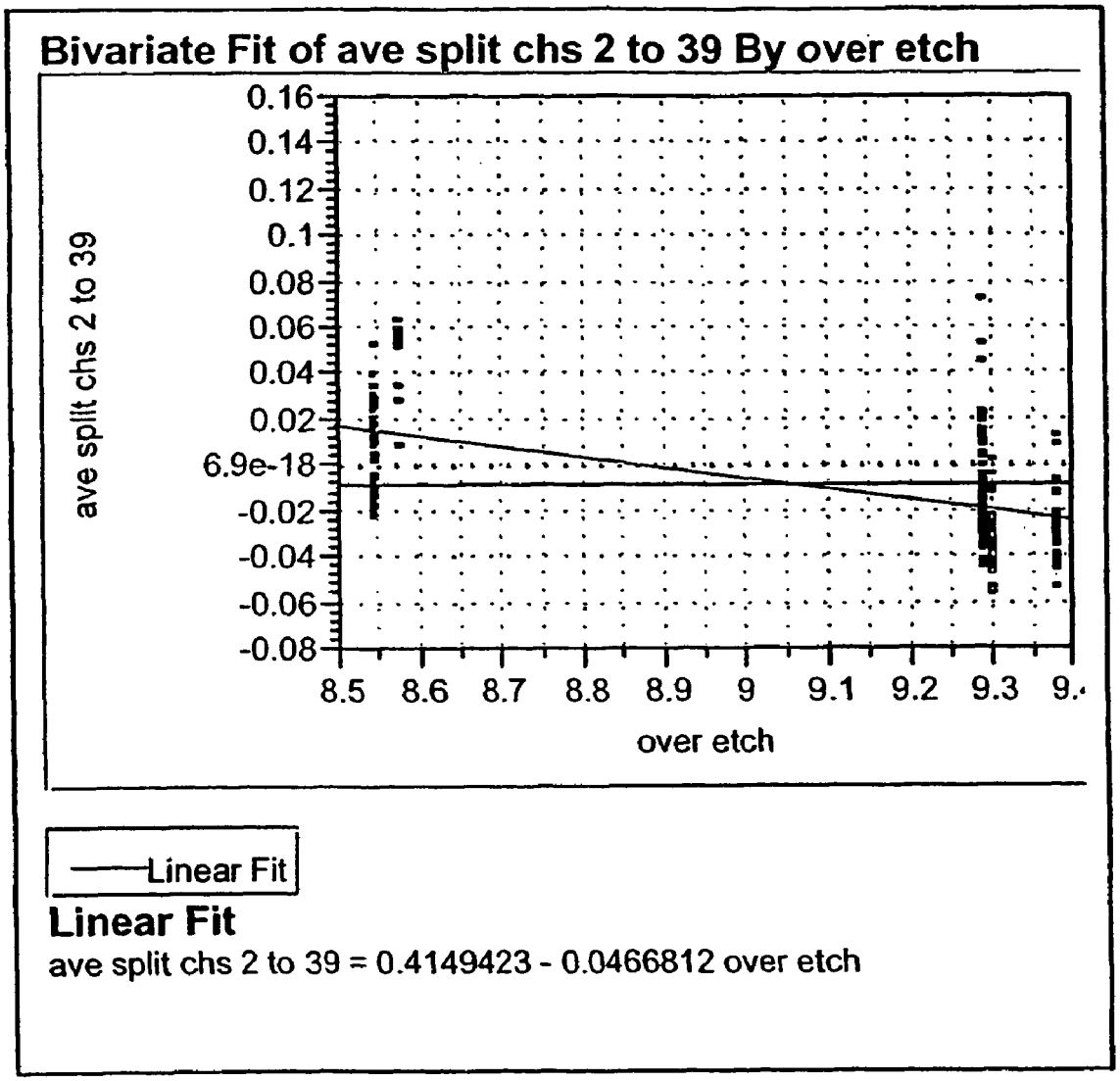
FIG. 5 is a graph of experimental results showing the average wavelength splitting in nanometers against waveguide core+overetch depth in micrometers.
Figure 6:
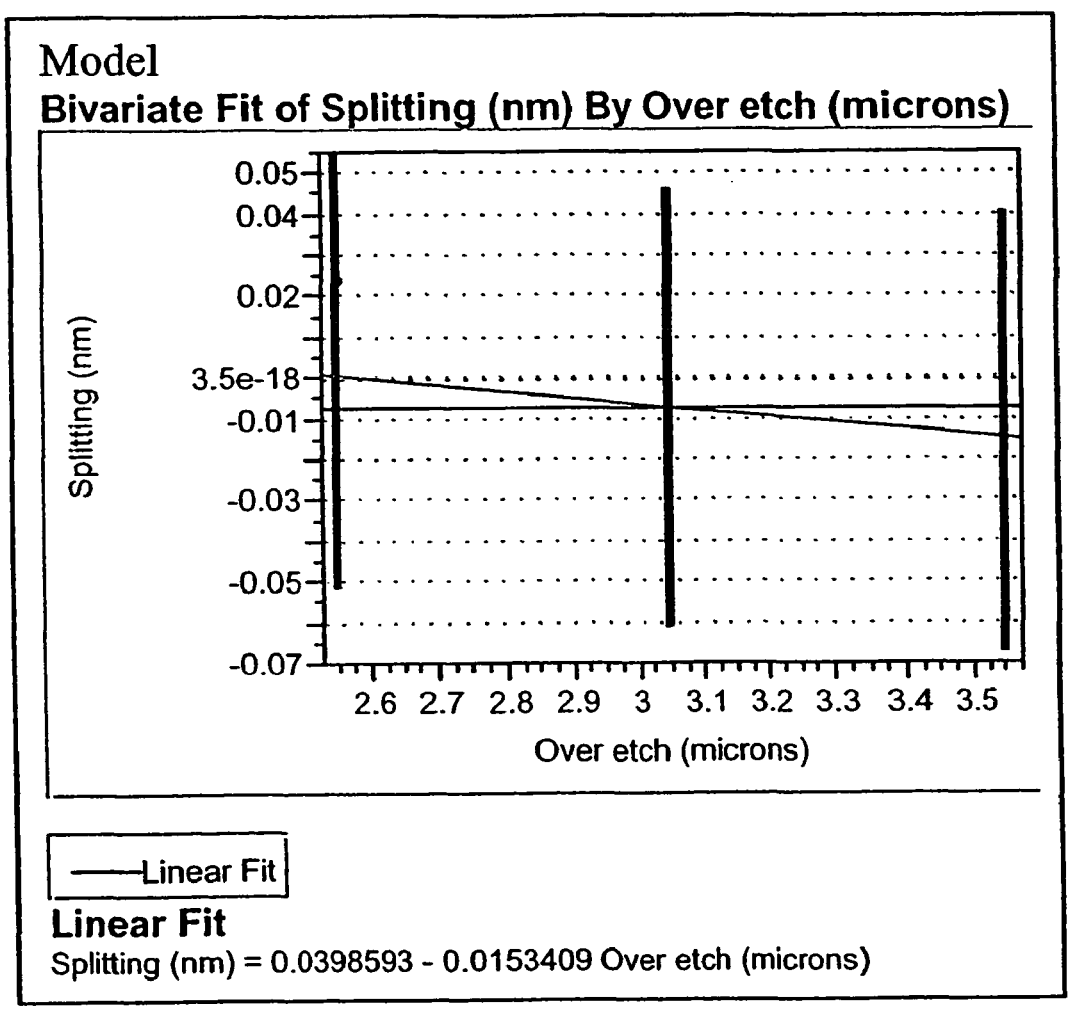
FIG. 6 is a plot of simulated results showing the variation in splitting in nanometers against overetch depth in micrometers.

FIG. 5 is a plot of the measured average splitting in channels 2 to 39 for each measured AWG die, plotted against the measured total height H.sub.T (in μm) of "waveguide core+over-etch depth" averaged over all the AWGs measured in each batch of wafers of AWGs. Measurements from channels 1 and 40 were not taken in any of the die since these can sometimes produce spurious results which can be misrepresentative of the general trend for the other channels. In all the measured AWGs the height of the core was known to be approx. 6 μm. From our simulations and experimental results we believe that variation in the core height will have practically no effect on the splitting (see below). As can be clearly seen from FIG. 5, the best linear fit to the measurements crosses from positive to negative splitting as the total height HT (and therefore as the over-etch depth) increases. Assuming the core height is 6 μm this plot shows a zero splitting will be obtained at an over-etch depth of about 3.05 μm. FIG. 6 is a plot of the corresponding simulated results for the variation of the splitting with the over-etch depth. For each of three chosen over-etch depths, points are plotted for all the different possible values (which the simulation software can handle) of the other parameters a,b,c,e,f,g,h within the above-mentioned limits. The value of the array pitch, h, used in the simulations was used as a fitting parameter to match the experimental results to those obtained with the model. It was found that a value of h=13.55 μm in the simulations achieved a good match between the two sets of results, as can be seen by comparing FIGS. 5 and 6.

Correlation Between Waveguide Width and Splitting

Figure 7:
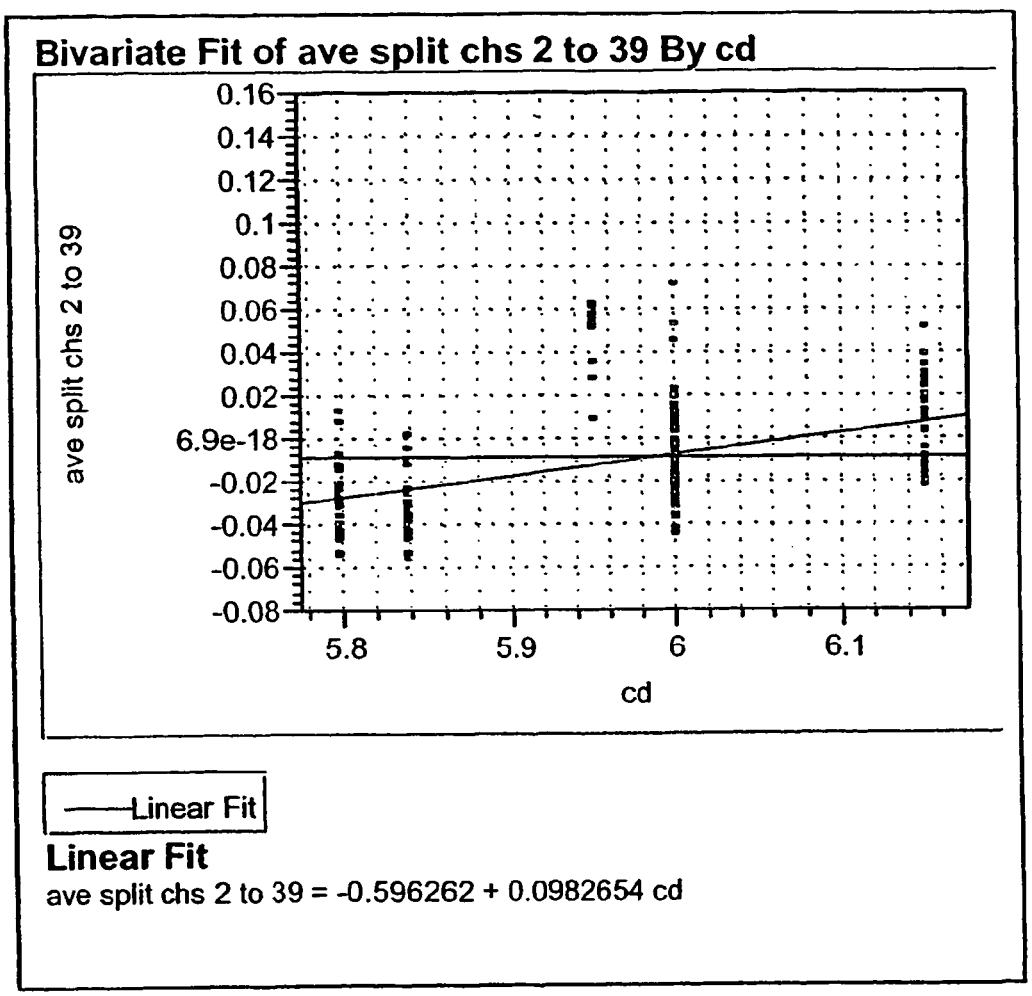
FIG. 7 shows experimental results of the average wavelength splitting in nanometers against core width of the array waveguide in micrometers.
Figure 8:
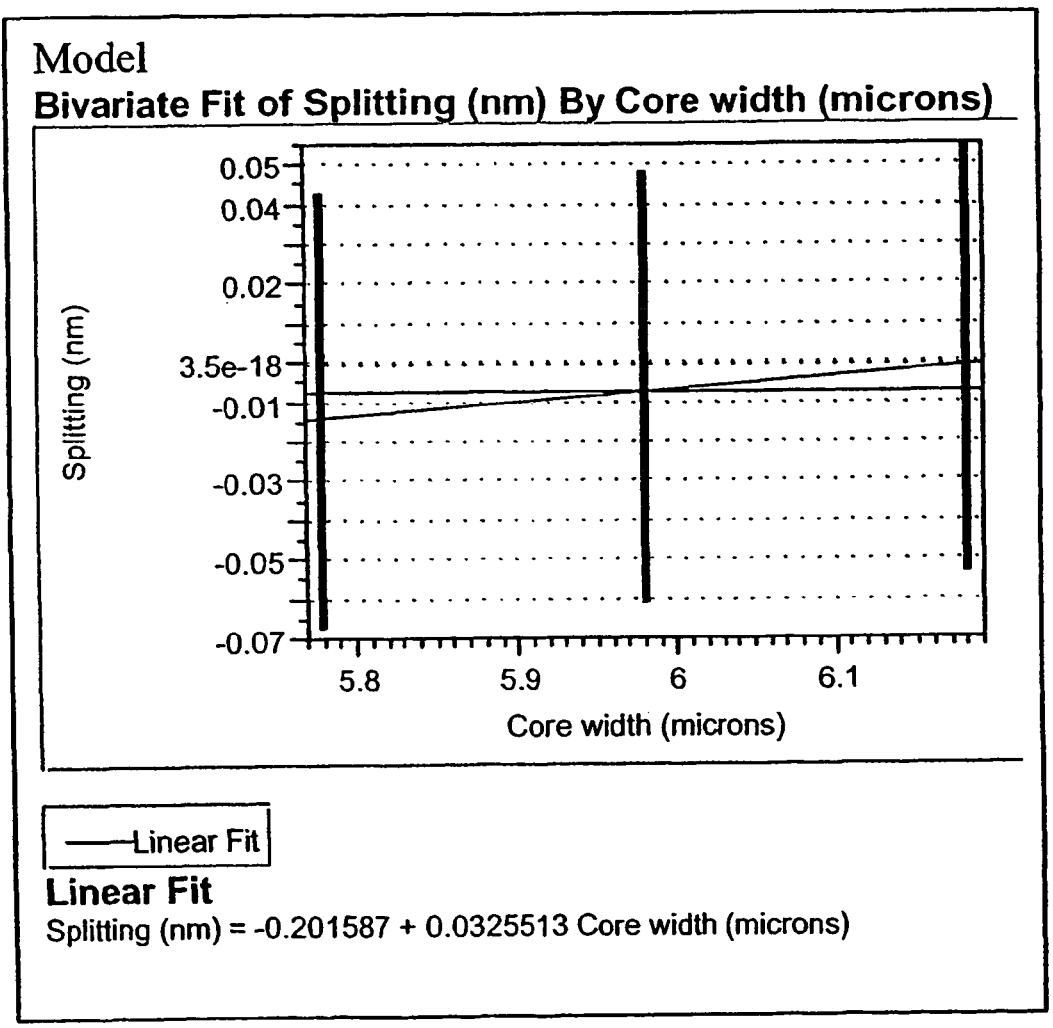
FIG. 8 shows the simulated results at three different wavelengths of wavelength splitting in nanometers against core width in micrometers.

FIG. 7 is a plot of the measured average splitting in channels 2 to 39 for each measured AWG die, against the core width (cd) in μm of the array waveguides (i.e. width of the waveguide core in direction parallel to the plane of the substrate of the AWG die), averaged over all the AWGs measured in each batch of wafers of AWGs. From the resulting linear fit it can be seen that the splitting changes from negative to positive splitting, with increasing waveguide width. FIG. 8 is a graph of the simulated results at three different waveguide widths, again using the array pitch h as a fitting parameter to fit the experimental results to the simulated results. For each of three chosen waveguide core widths, points are plotted for all the different possible values (which the simulation software can handle) of the other parameters a,b,c,d,f,g,h within the above-mentioned limits. Again, the simulation closely matches the measured results.

Correlation Between Clad Stress and Splitting

Figure 9:
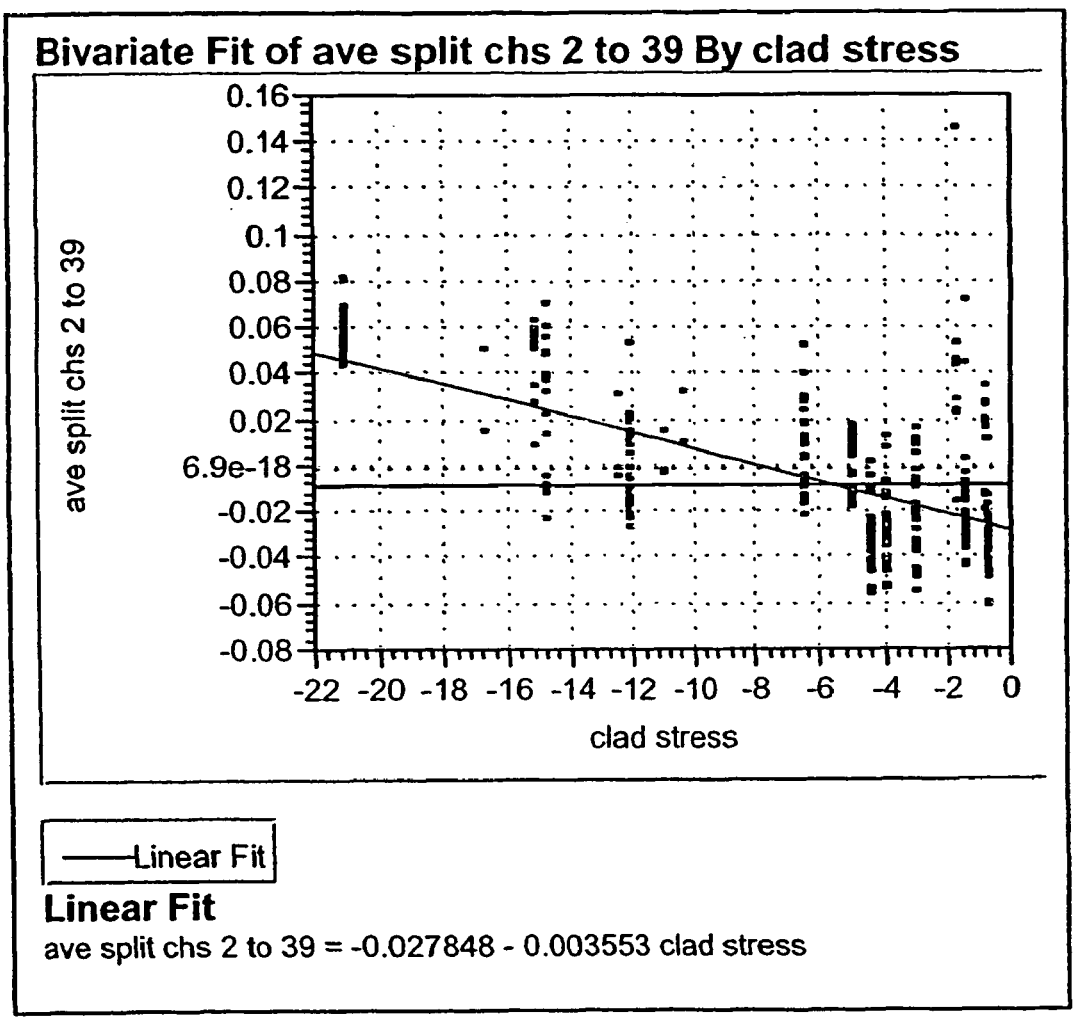
FIG. 9 shows experimental results of the average wavelength splitting in nanometers against the measured stress in the (over) cladding of the array waveguides in M pa.
Figure 10:
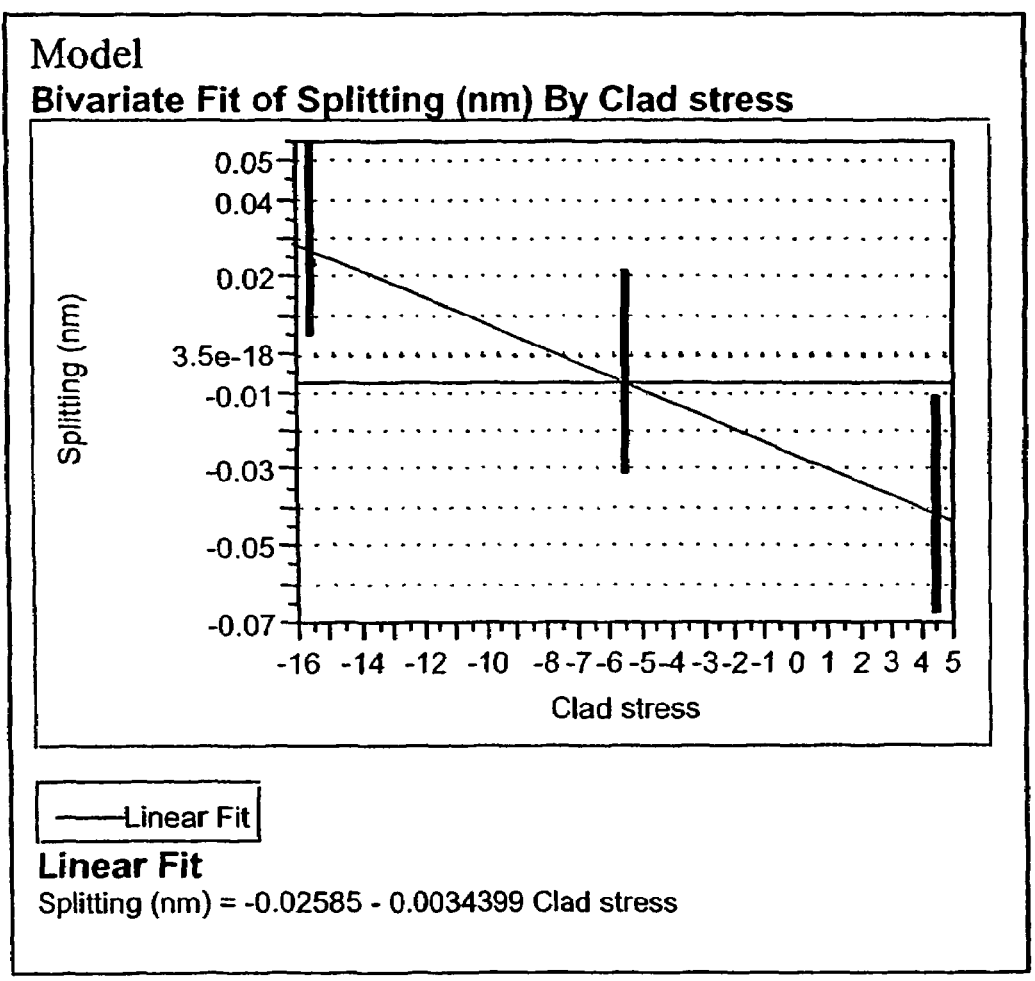
FIG. 10 shows the simulated results corresponding to the experimental results of FIG. 9.

FIG. 9 is a plot of the measured average splitting in channels 2 to 39 for each measured AWG die, against the measured stress in the cladding of the array waveguides, averaged over all the AWGs measured in each batch of wafers of AWGs. The horizontal axis has been calibrated to represent the measured compressive (−ve) or tensile (+ve) stress in the cladding, in MegaPascals. These stress measurements were obtained by measuring bowing of the wafer on which the waveguides cores and cladding layer have been formed. A linear fit has been made to the plotted points in FIG. 9, showing that the average splitting changes linearly from positive to negative splitting as the clad stress increases over the illustrated range from negative clad stress to positive clad stress (i.e. compressive to tensile stress). FIG. 10 shows the corresponding simulated results. For each of three chosen clad stress values the simulation was carried out for, points are plotted for all the different possible values (which the simulation software can handle) of the other parameters a,b,c,d,e,f,h within the above-mentioned limits. The array pitch h was again used as a fitting parameter. Again the simulated results generally match the experimental results.

Correlation Between Core Stress and Splitting

Figure 11:
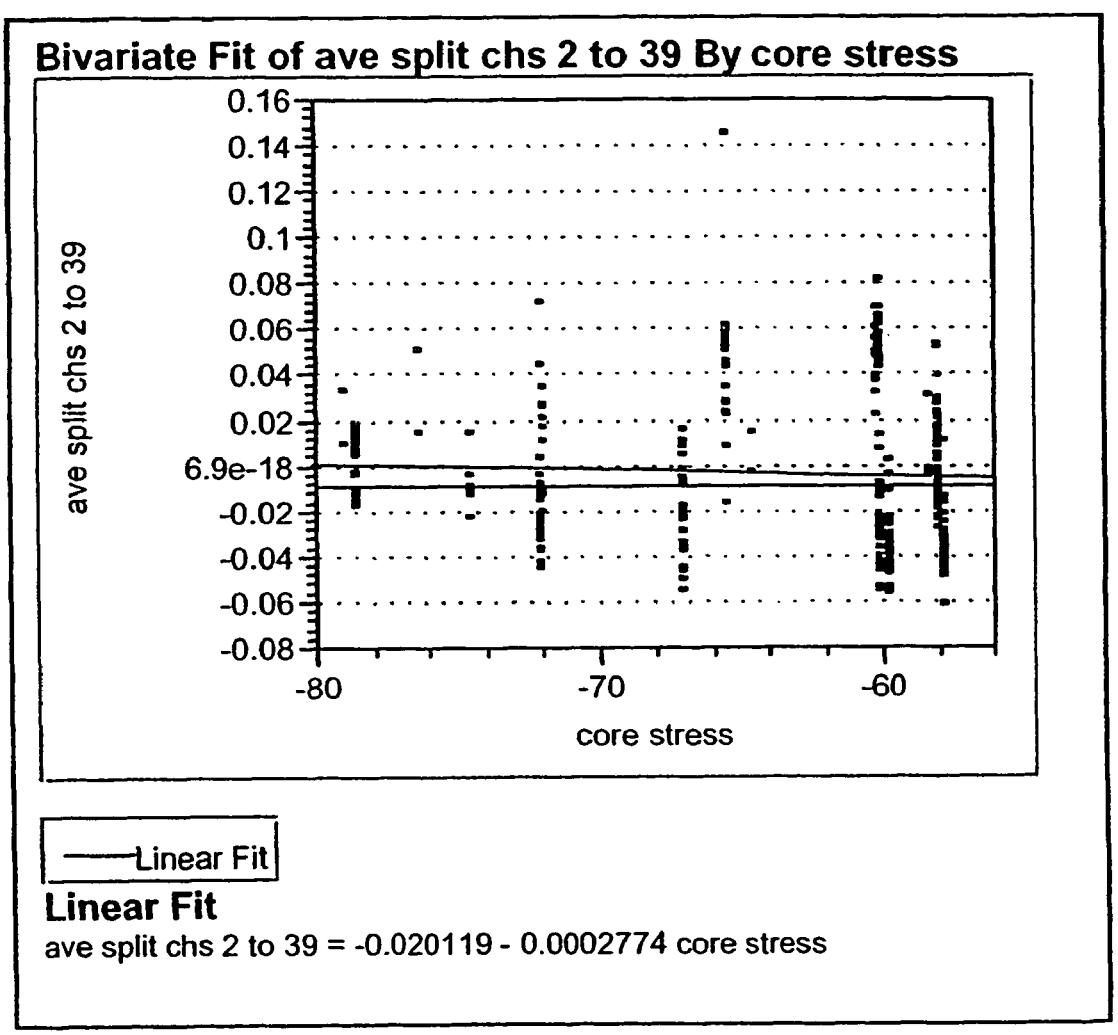
FIG. 11 shows the measured average wavelength splitting in nanometers against the measured stress in the core in Mpa.
Figure 12:
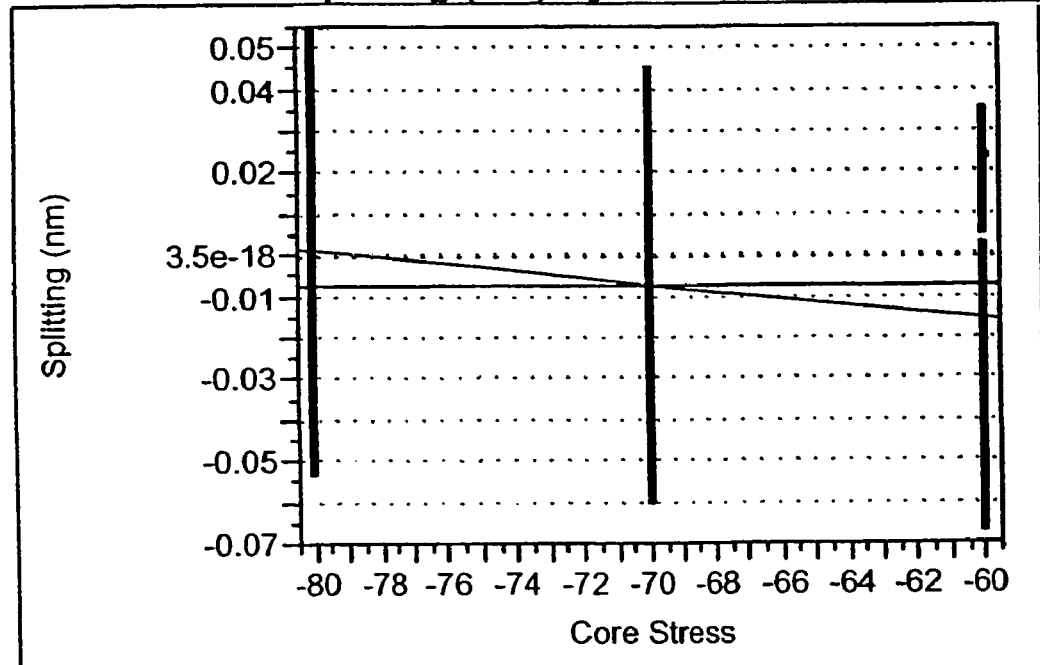
FIG. 12 shows the simulated results corresponding to the experimental results of FIG. 11.

FIG. 11 is a plot of the measured average splitting in channels 2 to 39 for each measured AWG die, against the measured stress in the core of the array waveguides, averaged over all the AWGs measured in each batch of wafers of AWGs. The horizontal axis has been calibrated to represent the measured compressive stress in the core, in Mega Pascals. (The stress in the core is always compressive, not tensile.) The stress measurements were obtained by measuring bowing of the wafer on which the core layer has been deposited (but prior to the etching step to form the waveguide cores from the core layer). A linear fit has been made to the plotted points in FIG. 11, showing that the average splitting changes linearly from positive to negative splitting as the core stress decreases over the illustrated range of negative core stress. FIG. 12 is the corresponding fit of the simulated results for splitting vs. core stress. Again, points were plotted for all the different possible values (which the simulation software can handle) of the other parameters a,b,c,d,e,g,h within the above-mentioned limits. The array pitch h was again been used as a fitting parameter. It can be seen from comparing FIGS. 11 and 12 with FIGS. 10 and 9 that the variation in splitting with core stress is smaller than the variation of splitting with cladding stress.

Correlation Between Splitting and Core Index, Cladding Index and Core Height

The simulations and experimental measurements we carried out to study the correlation between the splitting and the refractive index of the core, the splitting and the refractive index of the cladding, the splitting and the height of the core (above the mesa), have shown that the variation of splitting with variation in these parameters is practically zero, or at least insignificant in comparison with the variation of the splitting with the other parameters of FIGS. 5 to 12. The variation in splitting with variation in core height was, in particular, found to be practically zero.

Correlation Between Splitting and Temperature

Figure 13:
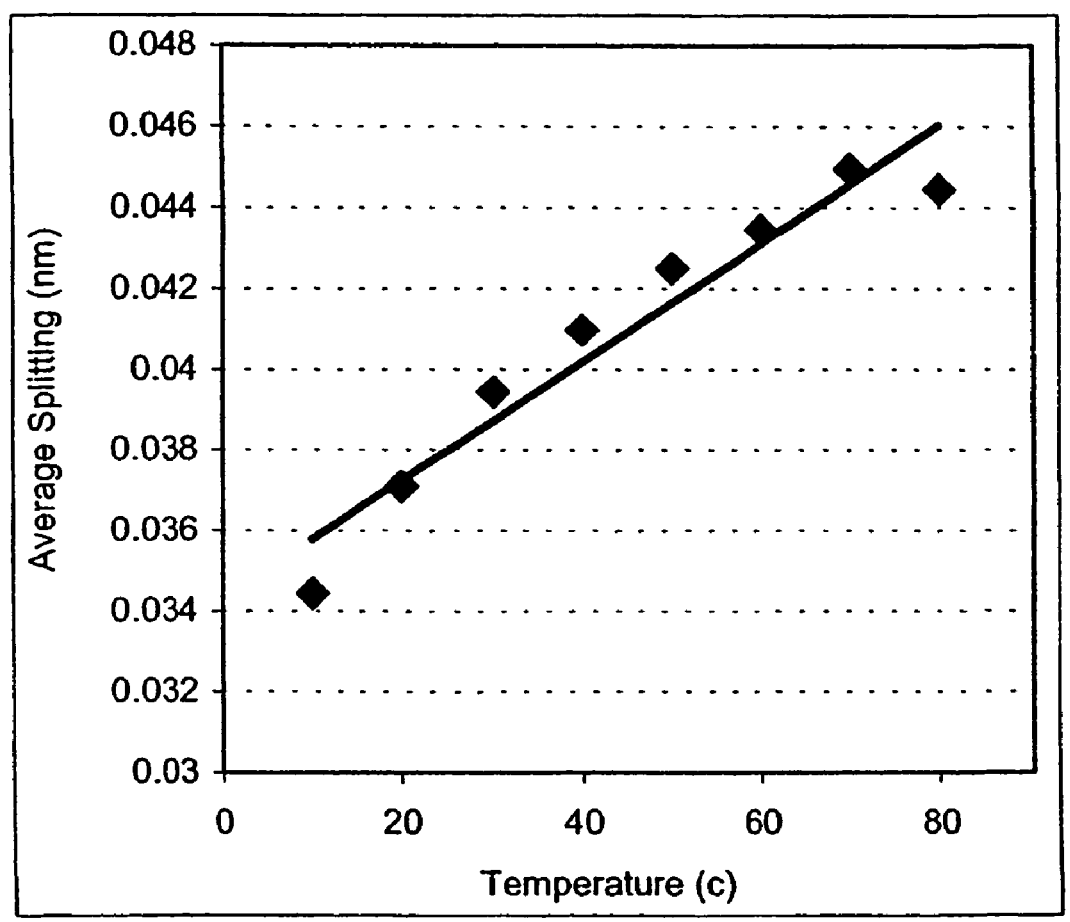
FIGS. 13 to 15 show simulated results for the variation in splitting of wavelength against temperature for different batches of wafers.
Figure 14:
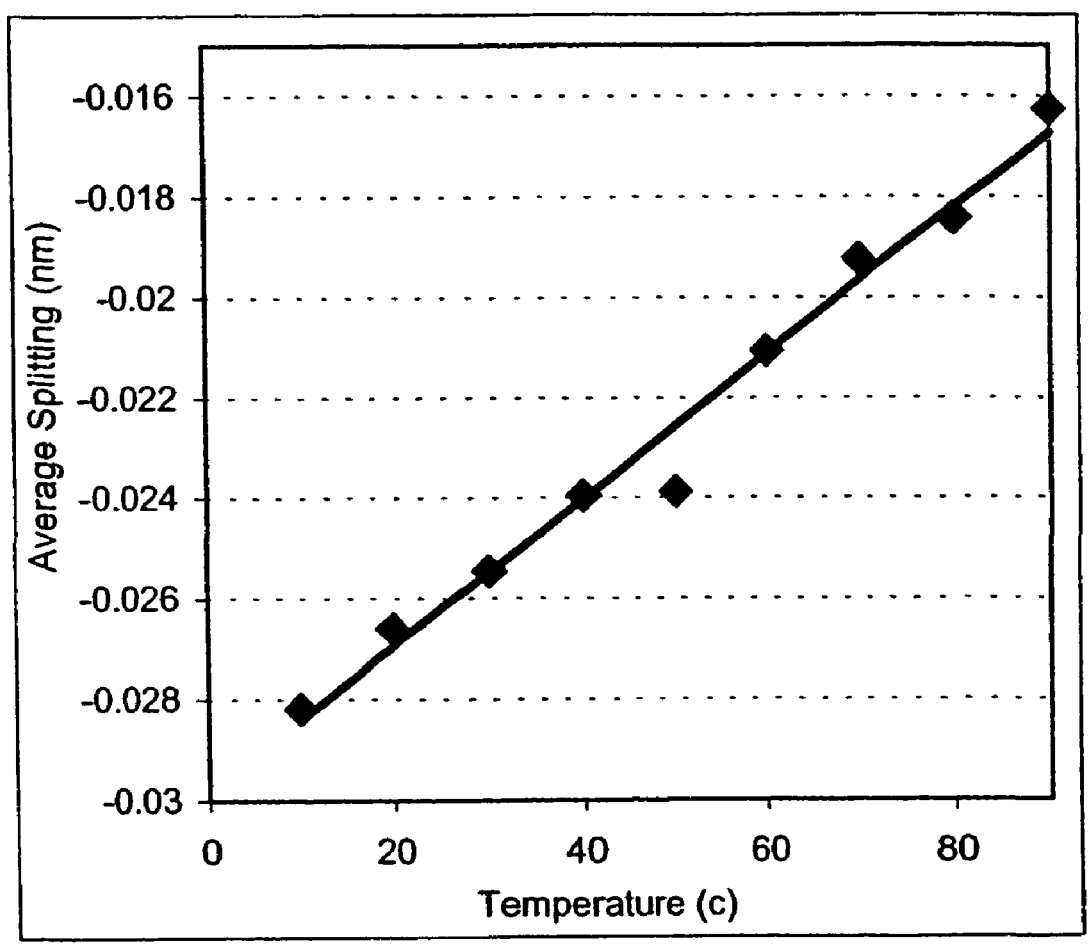
Figure 15:
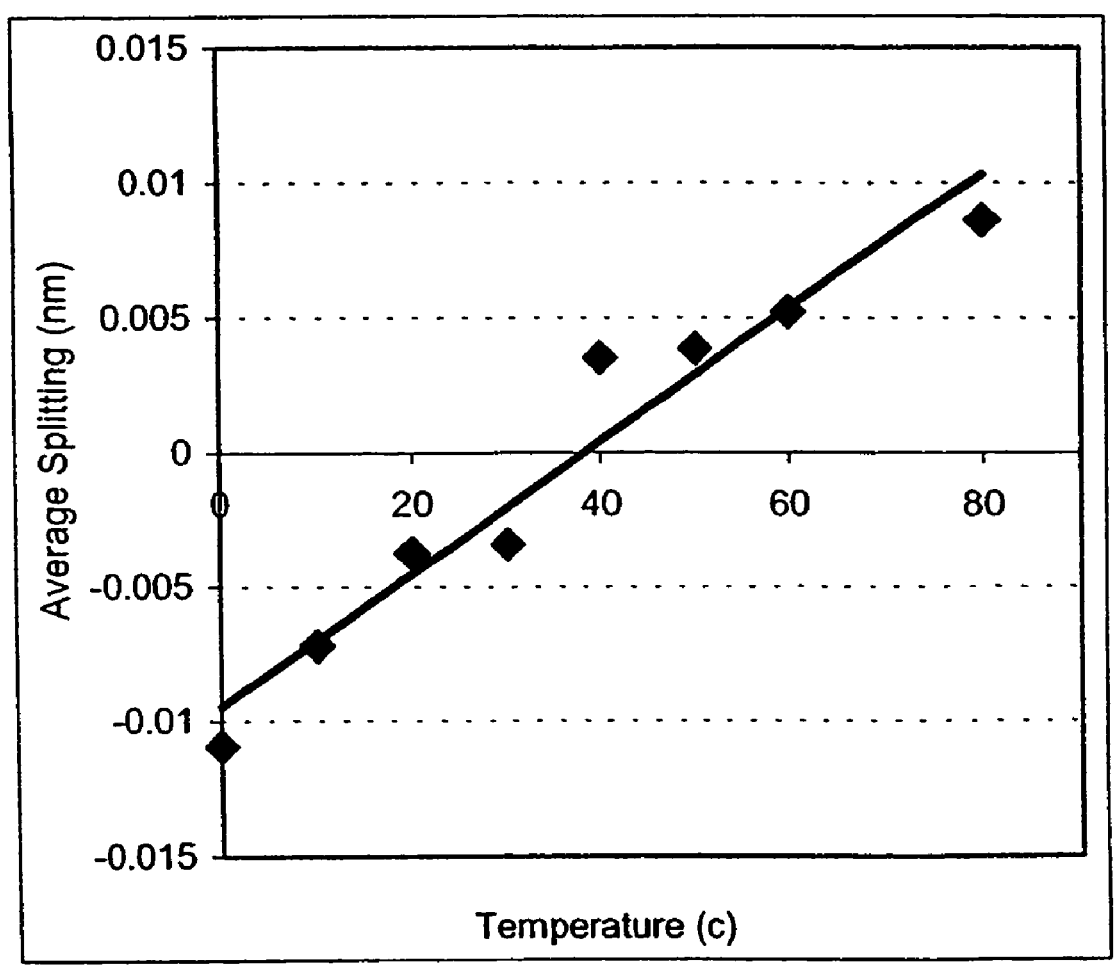

We also made practical measurements of the variation in the splitting with variation of the temperature of the AWG die. The results of these measurements are plotted in FIGS. 13 to 15, for batches of wafers having positive average splitting, negative average splitting, and where the average splitting changes sign around 40° C. (As before, the average splitting of each AWG is calculated as the average splitting over channels 2 to 39 of the AWG die). These graphs clearly show that there is a linear relationship between splitting and temperature, for both positive and negative average splitting, the average splitting increasing linearly with temperature.

The measurements and simulated values obtained above for the splitting with variation of the other parameters were all carried out for room temperature, namely approx. 22° C. Most AWGs are designed to operate at temperatures between 70 and 80 degrees Celsius. The graphs of FIGS. 13 to 15 indicate that the expected increase in splitting with change in temperature from room temperature (22° C.) to operating temperature (75° C.) is about 7.6 picometers.+−.1.2 picometers. It will thus be apparent that in order to compensate for variation in splitting with temperature, the designer should build in an offset in one or more of the other significant parameters such as the over-etch depth, the cladding stress and/or the waveguide width in order to ensure that the desired splitting value at the normal operating temperature of the AWG will be achieved. In the graphs of FIGS. 5 to 12, a solid straight line has been drawn showing an estimated target splitting of −8 picometers. Aiming for this value of splitting at room temperature, should give the desired (zero or minimal) splitting values at the operating temperature. From the graphs of simulated and experimental results we would propose that the over-etch depth should be within the range of 2.8 to 3.2 μm to obtain minimum splitting, for a cladding stress in the range of −10 to 0, preferably about −5, and a waveguide width in the range of 5.90 to 6.10 μm, preferably about 6.00 μm, where the array pitch (i.e. average spacing between the array waveguides) h=12 μm.

Conclusions

From the above it will be appreciated that, in addition to choosing an optimum value for the over-etch depth in order to minimize splitting, the waveguide core width and/or the clad stress and/or the core stress can also be chosen in order to further optimize the splitting, for any chosen depth of over-etch. Additionally, it will be appreciated that one must be careful when choosing values for the depth of over-etch and/or the waveguide width and/or the clad stress or core stress in order to reduce (positive) splitting that one does not choose too large an over-etch which would overshoot the desired zero splitting condition and result in a negative splitting. From the FIG. 5 graph, the optimum value for the over-etch, appears to be about 3 μm.

It will further be appreciated that the design parameter h, the average spacing of the array waveguides, affects the splitting. It is known that when this average spacing is increased the splitting generally decreases. So if the AWG designer chooses to use a larger value of h, the required depth of over-etch to maintain zero or minimal splitting will be reduced (for the same values of the waveguide core width, and clad stress). Alternatively, or additionally, a different waveguide width and/or different clad stress and/or different core stress could be used if a larger array pitch is to be used, in order to maintain zero or minimum splitting. We have also noted from simulations that for different values of the design parameter h the variation between splitting and the over-etch depth may change from a substantially linear relationship to a non-linear one i.e. the plot of splitting vs. over-etch depth changes from a linear line to a curved line.

The invention claimed is:

1. A method of fabricating an integrated optical device on a substrate, at least a face of the substrate providing a first cladding layer, the method comprising the steps of: (i) forming a core material layer on the first cladding layer; (ii) etching the device in regions forming a complement of a desired waveguide core, the etching step removing material from the core material layer and at least some material from the first cladding layer so that the first cladding layer forms a mesa formation substantially covered by the waveguide core; and (iii) forming a second cladding layer over the first cladding layer and waveguide core; wherein the height of the mesa formation is selected so as to give a substantially zero birefringence in the waveguide core.

2. A method of fabricating an integrated optical device on a substrate, at least a face of the substrate providing a first cladding layer, the method comprising the steps of; (i) forming a core material layer on the first cladding layer; (ii) etching the device in regions forming a complement of a desired waveguide core, the etching step removing material from the core material layer and at least some material from the first cladding layer so that the first cladding layer forms a mesa formation substantially covered by the waveguide core; and (iii) forming a second cladding layer over the first cladding and waveguide core; wherein the height of the mesa formation is selected to give a desired reduced level of birefringence in the waveguide core.

3. A method according to claim 1, in which the mesa formation has a height of at least 1 µm.

4. A method according to claim 3, in which the mesa formation has a height of between about 2 µm and about 4 µm.

5. A method according to claim 1, comprising the step, before step (i), of forming the first cladding layer on the substrate.

6. A method according to claim 5, in which the substrate is a silicon substrate.

7. A method according to claim 5, in which the first cladding layer is predominantly silicon dioxide.

8. A method according to claim 1, in which the linear coefficient of expansion of the material of the second cladding layer is greater than that of the material of the core material layer.

9. A method according to claim 4, wherein the mesa formation has a height of between 2.5.and 3.5 µm.

10. A method according to claim 1, wherein the height of the mesa formation, the stress in the second cladding layer, and the width of the waveguide cores in a direction parallel to the plane of the substrate, are all selected so as to give a substantially zero birefringence in the waveguide core.

11. A method according to claim 10, wherein the height of the mesa formation, the stress in the second cladding layer, the stress in the core, and the width of the waveguide cores in a direction parallel to the plane of the substrate, are all selected so as to give a substantially zero birefringence in the waveguide core.

12. A method according to claim 1, wherein the stress in the second cladding layer is selected to be in the range of −20 to +10 MPascals.

13. A method according to claim 1, wherein the width of the waveguide core in a direction parallel to the plane of the substrate is selected to be in the range of 5.80 to 6.20 µm.

14. A method according to claim 13, wherein the width of the waveguide core in a direction parallel to the plane of the substrate is selected to be 6.0 µm.

15. A method according to claim 1, wherein the value of at least one of the following parameters is selected in order to substantially compensate for variation in the birefringence of the waveguide core with temperature, so as to obtain substantially zero birefringence in the waveguide core at predetermined operating temperature of the device: height of the mesa formation; stress in the second cladding layer; stress in the core; width of the waveguide cores in a direction parallel to the plane of the substrate.

16. An integrated optical device comprising: a substrate, at least a face of the substrate providing a first cladding layer, the first cladding layer including a mesa formation; a waveguide core formed on the first cladding layer so that the waveguide core substantially covers the mesa formation; and a second cladding layer formed over the waveguide core and the first cladding layer; wherein the height of the mesa formation is such that there is substantially zero birefringence in the waveguide core.

17. An integrated optical device according to claim 16, wherein the cross-section of the waveguide core has a substantially square shape.

18. An integrated optical device according to claim 16, wherein the width of the mesa formation is equal to the width of the core.

19. An arrayed waveguide comprising: a substrate, at least a face of the substrate providing a first cladding layer, the first cladding layer including a mesa formation; a plurality of array waveguides provided on the substrate, each array waveguide having a waveguide core formed on the first cladding layer so that the waveguide core substantially covers the mesa formation; a second cladding layer formed over the waveguide cores and the first cladding layer; and wherein the height of the mesa formation is selected to give a reduced level of birefringence in the waveguide core and is in the range of about 2 to about 4 µm; the stress in the second cladding layer is in the range of −20 to +10 MPascals; and the width of the waveguide cores in a direction parallel to the plane of the substrate is in the range of 5.80 to 6.20 µm.

20. An arrayed waveguide grating according to claim 19, wherein the width of the waveguide cores in a direction parallel to the plane of the substrate is in the range of 5.90 to 6.10 µm.

* * * * *